(12) United States Patent
Ivan et al.

(10) Patent No.: US 8,010,060 B2
(45) Date of Patent: Aug. 30, 2011

(54) APPARATUS AND METHOD FOR REDUCING STRAY RF SIGNAL NOISE IN AN ELECTRICALLY POWERED VEHICLE

(75) Inventors: William T Ivan, Shelby Township, MI (US); Edward L. Kaiser, Orion, MI (US); Grantland I. Kingman, Waterford, MI (US); David J. Trzcinski, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1035 days.

(21) Appl. No.: 11/847,142

(22) Filed: Aug. 29, 2007

(65) Prior Publication Data

US 2009/0058010 A1 Mar. 5, 2009

(51) Int. Cl.
*H04B 1/034* (2006.01)
*B60K 17/00* (2006.01)
*B60K 17/22* (2006.01)
*B60K 17/24* (2006.01)
*B23K 9/12* (2006.01)
*B23K 11/36* (2006.01)
*B60H 1/00* (2006.01)
*H01R 41/00* (2006.01)
*B60L 5/00* (2006.01)
*B60L 5/38* (2006.01)
*B60W 10/02* (2006.01)
*B60W 10/10* (2006.01)
*B60W 10/18* (2006.01)
*F16D 67/00* (2006.01)

(52) U.S. Cl. ........ 455/99; 192/3.51; 192/218; 191/45 R; 191/1 R; 180/337; 180/376; 180/381

(58) Field of Classification Search ................. 455/63.1, 455/67.13, 501, 569.2, 99, 278.1, 238.1, 455/222; 192/3.51, 218; 191/45 R, 1 R; 180/269, 337, 376, 381, 383
See application file for complete search history.

(56) References Cited

U.S. PATENT DOCUMENTS

| | | | |
|---|---|---|---|
| 4,114,902 A | | 9/1978 | Orlowski |
| 4,243,232 A | * | 1/1981 | Repella ................... 277/568 |
| 5,021,725 A | * | 6/1991 | Jimbo et al. ............... 318/801 |
| 5,570,494 A | * | 11/1996 | Prince, Jr. ................. 29/33 K |
| 6,285,533 B1 | * | 9/2001 | Sakamoto ................. 361/31 |
| 6,306,533 B1 | * | 10/2001 | Mund et al. .............. 429/434 |
| 2007/0205036 A1 | * | 9/2007 | Ogata et al. .............. 180/337 |
| 2009/0166108 A1 | * | 7/2009 | Gross et al. .............. 180/65.21 |
| 2010/0276894 A1 | * | 11/2010 | Jin et al. .................. 277/500 |

* cited by examiner

*Primary Examiner* — Andrew Wendell

(57) ABSTRACT

RF signal noise in a powertrain utilizing a power inverter module and electric motor is attenuated by providing a low impedance connection between a transmission output shaft and housing.

17 Claims, 3 Drawing Sheets

APPARATUS AND METHOD FOR REDUCING STRAY RF SIGNAL NOISE IN AN ELECTRICALLY POWERED VEHICLE

TECHNICAL FIELD

This disclosure is related to a vehicular powertrain with an electric motor utilizing a power inverter module.

BACKGROUND

Engineers are developing vehicles utilizing diverse sources of energy. Many of these innovative energy sources are not applied directly to a vehicle powertrain, but are instead first transformed into electric power and harnessed through a power inverter module coupled to an electric motor. Power inverter modules allow the transformation of direct current electrical power to alternating current electrical power for use by the motor. While alternating current is desirable for use in the electric motor for a wide variety of benefits, the generation of alternating current in the power inverter module also creates drawbacks, including the creation of stray radio frequency ("RF") signal noise.

An electromagnetic field is generated whenever there is a change in voltage created in a conductive medium. As is well known in the art, power inverter modules utilize high-speed switching to generate the alternating current power source for the electric motor, and this switching may generate rises in voltage with durations measured in nanoseconds. The voltage changes generated by the power inverter module travel through the electric motor and create a circuit through attached conductive pieces. As in any electrical circuit, the electrical charge created at the generating source will seek to close the circuit through the path of least resistance. However, if the circuit is open, meaning no conductive path exists for the electrical charge to flow back to the generating source, the voltage changes generated by the source propagate through any attached conductive medium before creating an electrical field across the gap to complete the circuit. This propagation of voltage changes causes any attached conductive medium to act like a broadcasting antenna, wherein an electromagnetic field in the form of RF signal noise is created by the propagated voltage changes. Stray RF signal noises are stray radio signals or interference patterns that may impact or degrade the performance of other nearby electrical equipment. One way to reduce the generation of stray RF signal noise is to reduce RF signal generating voltage propagation by providing a conductive return path for charge created in high-speed switching to return to the generating source.

In vehicular powertrain applications, electric motors are found in conductive attachment to the drive train, frequently taking the form a transmission output shaft extending from a transmission housing. This transmission output shaft spins and, therefore, cannot come into solid contact with the transmission housing. A metallic bearing is frequently used to create an axially fixed but rotating union between the transmission housing and the transmission output shaft. While this contact provided by the bearing may be in some conditions be adequate as a conductive contact between the transmission housing and the transmission output shaft, a thin film of transmission fluid actually exists as a lubricant between the mating surfaces of the bearing. A small gap such as one created by a lubrication film will, in many applications, causes a small arc to form across the film, thereby closing the circuit and eliminating any potential issues of RF signal noise. However, testing has shown that recent developments in power inverter modules utilizing higher switching speeds have resulted in the gap caused by the film becoming more significant. The voltage rise in the power inverter module and any attached conductive medium is so rapid that the voltage propagates through the conductive medium before an arc may form to cross the gap.

SUMMARY

An apparatus for reducing RF signal noise in a powertrain utilizing a power inverter module includes a transmission housing grounded to the power inverter module, a transmission output shaft emerging from the transmission housing through an opening, and a low impedance connection between the transmission output shaft and the transmission housing, wherein the low impedance connection is not lubricated by transmission fluid.

BRIEF DESCRIPTION OF THE DRAWINGS

One or more embodiments will now be described, by way of example, with reference to the accompanying drawings, in which.

DETAILED DESCRIPTION

Figure 1:
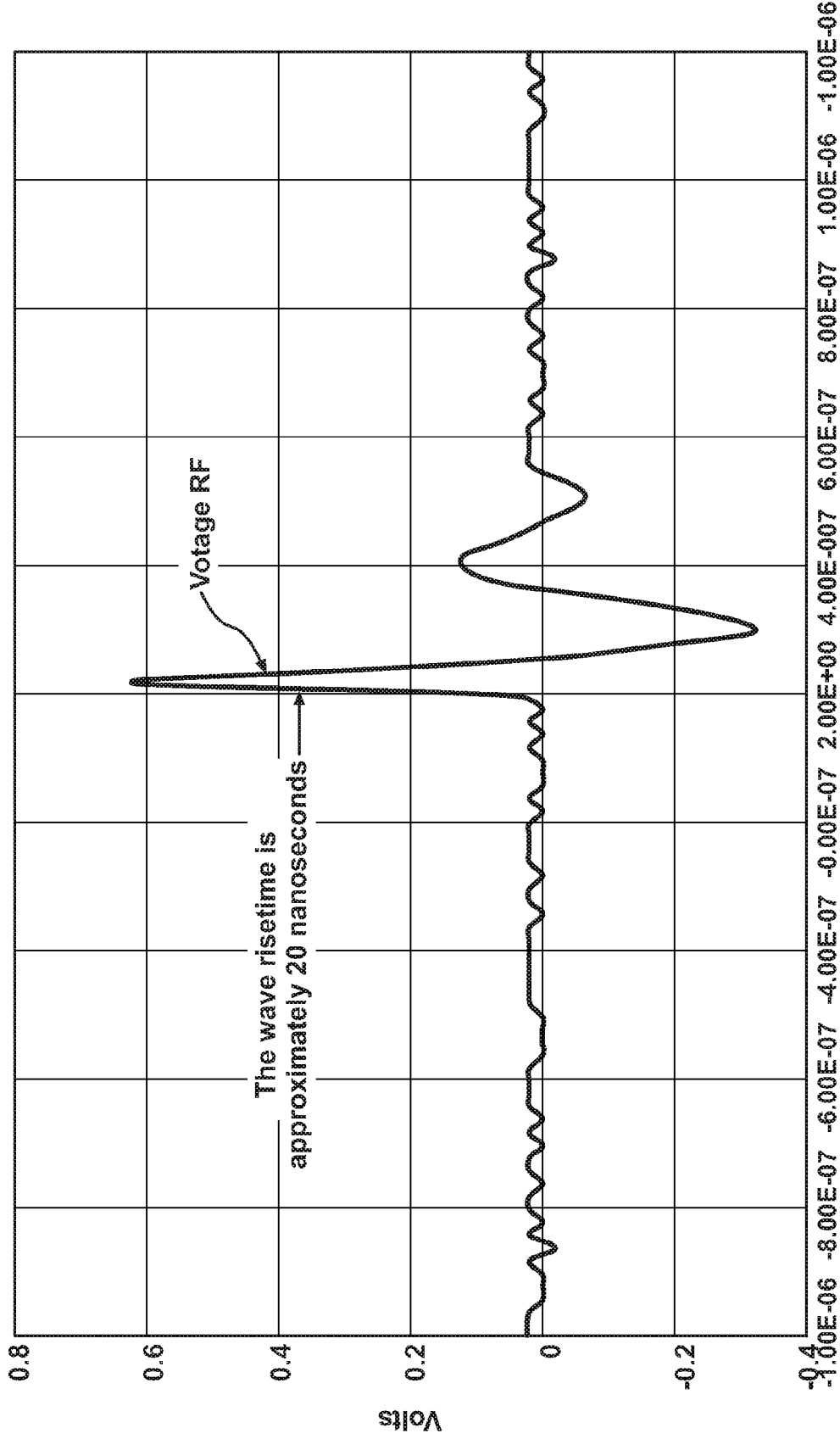
FIG. 1 is a data graph illustrating a principle behind the disclosure as tested in an exemplary embodiment of a known powertrain system.

Referring now to the drawings, wherein the showings are for the purpose of illustrating certain exemplary embodiments only and not for the purpose of limiting the same, FIG. 1 is a data graph of voltage potential between a transmission housing and a transmission output shaft versus time, illustrating a principle behind the disclosure. Measuring voltage potential is a means of measuring the voltage propagation created by high energy switching, otherwise known as RF energy propagation. RF energy propagation has significant implications to the creation of stray RF signal noise or radio noise. RF energy flowing though any length of conductive material may cause the material to act as a transmitting antenna, and the geometry of the material has implications to the frequency of RF signal noise produced. In applications such as vehicular systems, stray RF signal noise may cause unintended interference with other systems in the vehicle and should be avoided. It has been found that the drive shaft of a vehicle, a large metallic cylinder extending rearward from the transmission to the rear axle, tends to be a length within a range that produces interference to AM band radio reception and other systems when the drive shaft is excited with RF energy. The data illustrated in FIG. 1 depicts the creation of a voltage potential within a transmission output shaft 40 with reference to a transmission housing 20, indicating that an RF energy flow and a corresponding potential for stray RF signal noise are created within the transmission output shaft 40. Transmission output shaft 40 is conductively connected to a drive shaft, and, therefore, any RF energy propagated throughout transmission output shaft 40 will excite the drive shaft and cause the generation of stray RF signal noise. A reduction of this voltage potential between the transmission housing 20 and the transmission output shaft 40 will reduce the flow of RF energy outside of the return path, thereby reducing associated stray RF signal noise.

Figure 2:
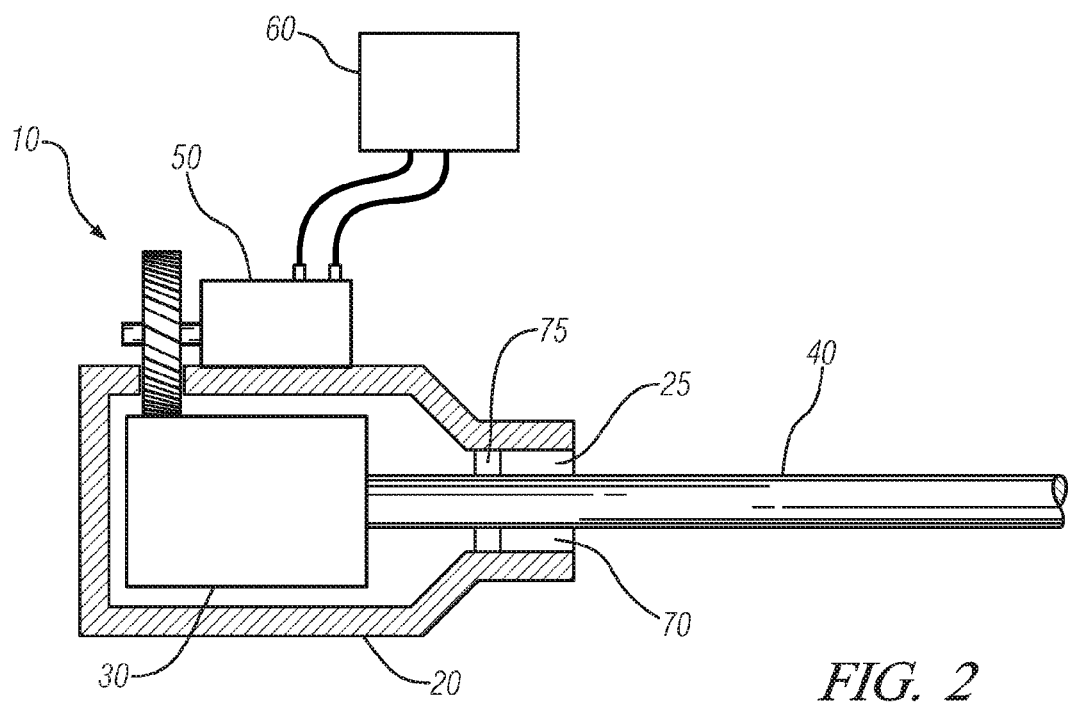
FIG. 2 is a sectional view of an exemplary known powertrain system in accordance with the disclosure.

FIG. 2 depicts a transmission housing 20, a transmission drive train 30, transmission output shaft 40, and an electric motor 50 in an exemplary embodiment of a known powertrain system 10. Transmission housing 20 is a metallic casing covering the components of a transmission assembly. Transmission housing 20 is conductively attached to the casing of electric motor 50 and the vehicle ground. Alternatively, the transmission housing may also comprise the casing of the motor 50. These ground connections provide an adequately low impedance return path to power inverter module 60 to virtually eliminate voltage changes with respect to the power inverter module. Internal to transmission housing 20, transmission drive train 30 may include gears, a torque converter and other devices well known in the art to transform a mechanical rotational input into another mechanical rotational output. In this particular embodiment, electric motor 50 is affixed to transmission housing 20 and has a direct mechanical coupling to transmission drive train 30. Transmission drive train 30 connects to transmission output shaft 40 for the purpose of providing a rotational torque to drive the vehicle. Transmission output shaft 40 extends from within transmission housing 20 through an opening 25 in transmission housing 20. Transmission output shaft 40 spins rapidly throughout the operation of powertrain system 10. Therefore, direct contact between the spinning transmission output shaft 40 and the stationary transmission housing 20 is not feasible due the friction and wear that would result. Instead, a gap 70 is created and maintained around the transmission output shaft 40 inside opening 25 by bearing 75. Although bearing 75 may primarily comprise conductive metallic components, conditions created by high-speed switching in power inverter module 60 cause small gaps created by lubricating films within bearing 75 to act as non-conductive gaps. Therefore, in transmissions of vehicles such as the exemplary embodiment of FIG. 2 using power inverter modules utilizing high-speed switching, no effective direct path exists for voltage potential created in the power inverter module to return to the power inverter module.

Figure 3:
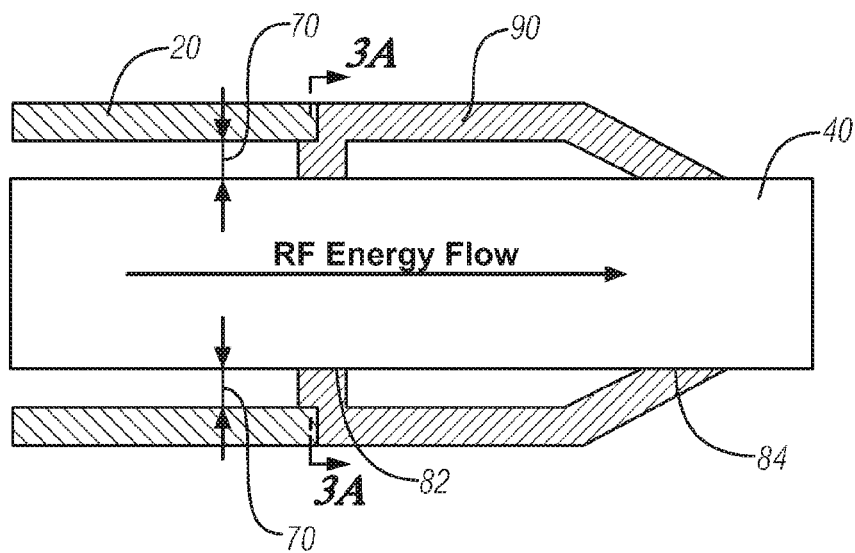
FIGS. 3 and 3a are partial sectional views through an exemplary embodiment of a known transmission seal as it interacts with a transmission housing and a transmission output shaft to seal the associated gap in accordance with the disclosure.
Figure 3A:
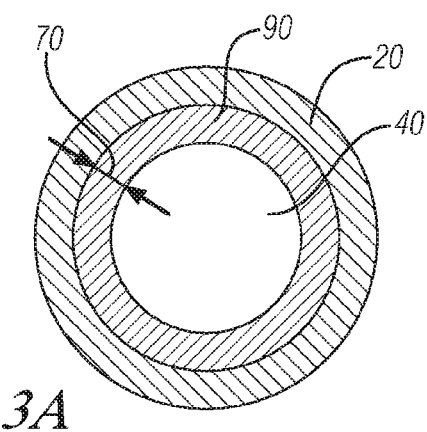

Gap 70 around transmission output shaft 40 is not left open. A transmission seal is utilized to close gap 70 and keep contaminants from entering transmission housing 20. FIG. 3 illustrates an embodiment of a known powertrain system 10 with a known transmission seal 90 as it interacts with transmission housing 20 and a transmission output shaft 40 to seal gap 70. FIG. 3A illustrates a cross section of opening 25 at the point of interaction between known transmission seal 90 and transmission output shaft 40. Known transmission seal 90 is affixed to transmission housing 20 around opening 25 and acts to seal against the spinning transmission output shaft 40 along two cylindrical surfaces of slipping contact, wet seal area 82 and dry seal area 84. Known transmission seal 90 is made of a rubber material which is non-conductive. As a result, no conductive connection is present between transmission housing 20 and transmission output shaft 40. FIG. 3 shows RF energy flowing through transmission output shaft 40 with no direct return path to its source at electric motor 50.

Figure 4:
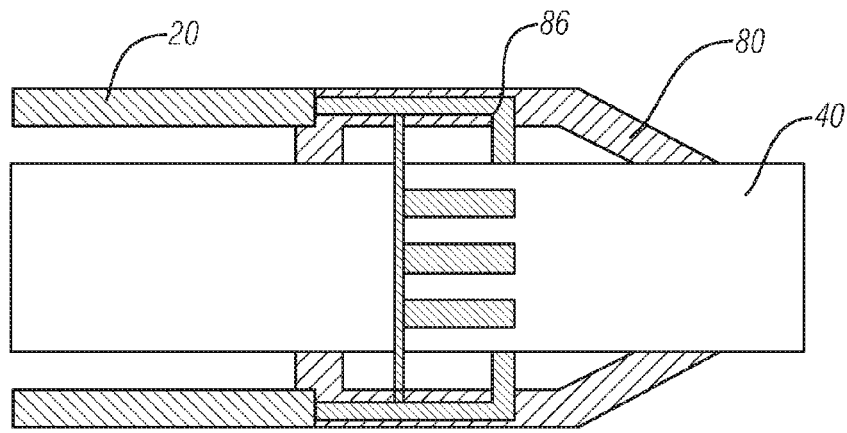
FIGS. 4 and 4a are partial sectional views through an exemplary embodiment of a conductive transmission seal inset with a low impedance brush connector in accordance with the disclosure.

FIG. 4 illustrates an embodiment showing the implementation of a conductive transmission seal 80 in accordance with the disclosure. Conductive transmission seal 80 is used in place of known transmission seal 90 as displayed in the embodiment illustrated in FIG. 3. Here, conductive transmission seal 80 includes a sealing structure similar to the structure of known transmission seal 90 shown in FIG. 3. Additionally, inset within the sealing structure is a low impedance brush connector 86 to bridge gap 70 and provide a direct path for RF energy to return to electric motor 50 and power inverter module 60 through transmission housing 20. While low impedance brush connector 86 is shown inset within conductive transmission seal 80, it should be appreciated that the location and particular shape of low impedance brush connector is not important to the function it serves to conductively connect portions of the transmission. An alternative embodiment is envisioned with low impedance brush connector 86 sandwiched between known transmission seal 90 and transmission housing 20. Another alternative embodiment is envisioned with low impedance brush connector affixed to the interior of transmission housing 20 and in brushing contact with transmission output shaft 40 within gap 70. Another alternative embodiment envisioned includes bearing 75 sealed from the transmission fluid and utilizing a conductive lubricant, wherein bearing 75 would act as the conductive connection, acting as a low impedance brush connector 86 between transmission housing 20 and transmission output shaft 40. Additionally, an alternative embodiment is envisioned whereby a conductive connection similar to the low impedance brush connector 86 could be used to connect the transmission output shaft directly to a vehicle ground, such as the metallic frame of the vehicle, where the vehicle ground connection would supply a conductive return path to the power inverter module.

As in any contact between a spinning a stationary object, increased wear can occur at the points that stationary low impedance brush connector 86 touches the spinning transmission output shaft 40. Therefore, it may be preferred to either conductively lubricate or reinforce through hardening this area in anticipation of this constant wear inherent to the arrangement.

As is known in the art, voltage potential across a given span in a circuit approaches zero as the impedance across the span approaches zero. By conductively connecting transmission output shaft 40 and transmission housing 20 with conductive transmission seal 80, inset with low impedance brush connector 86, the voltage potential between transmission output shaft 40 and transmission housing 20 is greatly reduced. In this way, RF energy propagation through transmission output shaft 40 and the connected drive shaft and the associated creation of stray RF signal noise may be greatly reduced.

Figure 4A:
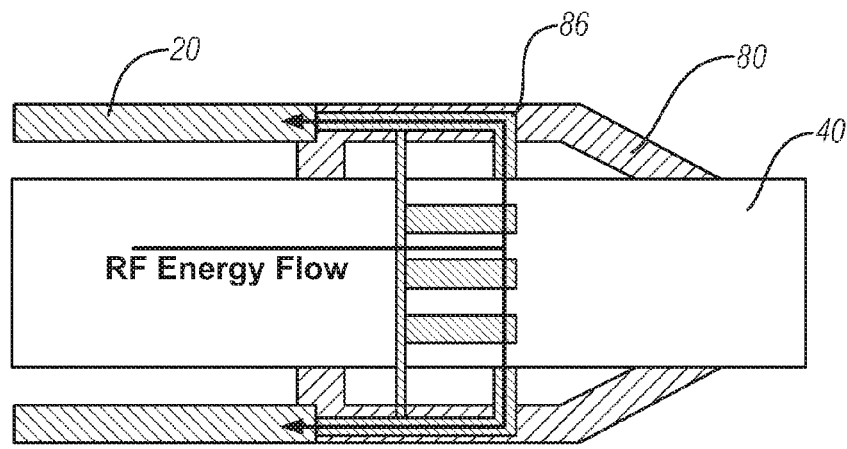

FIG. 4A illustrates the flow of RF energy in the embodiment illustrated in FIG. 4. As mentioned above, conductive transmission seal 80 provides a low impedance return path for RF energy to return to electric motor 50 through transmission housing 20. As illustrated in this figure, RF energy travels down transmission output shaft 40 to the region where the individual points of contact occur between low impedance brush connector 86 and transmission output shaft 40. The RF energy, instead of continuing to propagate down transmission output shaft 40, preferentially travels through low impedance brush connector 86 and into transmission housing 20. Because the RF energy may freely return to the generating source, the voltage potential between transmission output shaft 40 and transmission housing 20 is greatly reduced, thereby reducing RF energy propagation through transmission output shaft 40 and the associated creation of stray RF signal noise.

Figure 5:
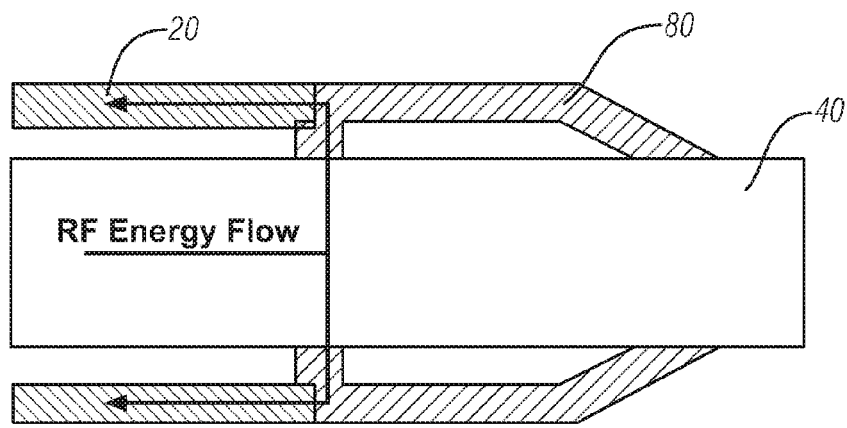
FIG. 5 is a partial sectional view through a conductive transmission seal comprising a low impedance conductive material in accordance with the disclosure.

FIG. 5 illustrates an embodiment showing the implementation of an alternative construction of conductive transmission seal 80 in accordance with the disclosure. Whereas the embodiment illustrated in FIG. 4 utilized a rubber-type non-conductive seal imbedded with a conductive low impedance brush connector 86, the embodiment of FIG. 5 replaces the rubber-type non-conductive seal with a conductive, low impedance material still operative to seal gap 70. Because the material operates as a direct conductive connection between transmission output shaft 40 and transmission housing 20, conductive transmission seal 80 utilizing a low impedance conductive material performs the same function as the seal described above in FIG. 4. Rubberized material may be treated or infused with certain other materials in order to make the final material conductive. For instance, by adding carbon nanotubes to the rubber material, a seal can be made to serve as a low impedance connector between two objects. Because the seal material is conductive, no low impedance brush connector 86 is required in this embodiment. The voltage potential between transmission output shaft 40 and transmission housing 20 is greatly reduced, thereby reducing RF energy propagation through transmission output shaft 40 and the associated creation of stray RF signal noise.

FIG. 5 additionally illustrates the flow of RF energy through conductive transmission seal 80 as the RF energy, instead of continuing to propagate down transmission output shaft 40, travels through conductive transmission seal 80 into transmission housing 20. This path of RF energy flow illustrates the result sought and results in significant reduction of stray RF signal noise generation.

While the disclosure has been described by reference to certain embodiments, it should be understood that changes can be made within the spirit and scope of the inventive concepts described. Accordingly, it is intended that the disclosure not be limited to the disclosed embodiments, but that it have the full scope permitted by the language of the following claims

The invention claimed is:

1. An apparatus for reducing RF signal noise in a powertrain utilizing
   a power inverter module, comprising:
   a transmission housing grounded to said power inverter module;
   a transmission output shaft emerging from said transmission housing through an opening; and
   a low impedance connection between said transmission output shaft and said transmission housing, wherein said low impedance connection is not lubricated by transmission fluid and permits the transmission output shaft to rotate.

2. The apparatus of claim 1, wherein said low impedance connection comprises a low impedance brush connector.

3. The apparatus of claim 1, wherein said low impedance connection comprises a conductive transmission seal located around and in contact with said transmission output shaft and in abutment to and in contact with said transmission housing.

4. The apparatus of claim 3, wherein said conductive transmission seal comprises an inset low impedance brush connector.

5. The apparatus of claim 4, wherein said low impedance brush connector is stationary with respect to said transmission housing and is in brushing contact with said transmission output shaft.

6. The apparatus of claim 3, wherein said conductive transmission seal comprises a seal made of conductive material.

7. The apparatus of claim 1, wherein said low impedance connection comprises a bearing situated between said transmission housing and said transmission output shaft, and wherein said bearing is lubricated with a conductive lubricant.

8. An apparatus for reducing RF signal noise in a powertrain driven by an electric motor, comprising:
   a power inverter module;
   a transmission housing grounded to said power inverter module; and
   an electrically conductive transmission seal situated around a transmission output shaft to prevent contaminants from entering said transmission housing, said conductive transmission seal operative to conductively connect said transmission output shaft to said transmission housing;
   wherein said electrically conductive transmission seal is not lubricated by transmission fluid and permits the transmission output shaft to rotate.

9. The apparatus of claim 8, wherein said conductive transmission seal comprises a low impedance brush connector.

10. The apparatus of claim 8, wherein said conductive transmission seal comprises a low impedance material.

11. The apparatus of claim 10, wherein said low impedance material comprises carbon nanotubes.

12. A method for reducing RF signal noise in a powertrain including a power inverter module and an electric motor, comprising:
    grounding a transmission output shaft to the power inverter module with a low impedance connection operative to substantially short out any voltage potential between said transmission output shaft and said power inverter module;
    wherein said a low impedance connection is not lubricated by transmission fluid and permits the transmission output shaft to rotate.

13. The method of claim 12, wherein said grounding comprises conductively connecting said transmission output shaft to a transmission housing conductively connected to said power inverter module.

14. The method of claim 13, wherein conductively connecting said transmission output shaft to a transmission housing comprises utilizing a transmission seal comprising electrically conductive material.

15. The method of claim 13, wherein said conductively connecting said transmission output shaft to a transmission housing comprises utilizing a transmission seal inset with a low impedance brush connector.

16. The method of claim 13, wherein said conductively connecting said transmission output shaft to a transmission housing comprises utilizing a bearing between said transmission output shaft and said transmission housing, wherein said bearing is lubricated by a conductive lubricant.

17. The method of claim 12, wherein said grounding comprises conductively connecting said transmission output shaft to a vehicle ground.

* * * * *